US011938352B2

(12) United States Patent
Arigue et al.

(10) Patent No.: US 11,938,352 B2
(45) Date of Patent: Mar. 26, 2024

(54) FILTERING MASK ASSEMBLY

(71) Applicant: Suzaleja B.V., Wageningen (NL)

(72) Inventors: Adel Arigue, Wageningen (NL); José Tavares, Wageningen (NL)

(73) Assignee: Suzaleja B.V., Wageningen (NL)

( * ) Notice: Subject to any disclaimer, the term of this patent is extended or adjusted under 35 U.S.C. 154(b) by 470 days.

(21) Appl. No.: 17/124,494

(22) Filed: Dec. 17, 2020

(65) Prior Publication Data

US 2021/0228920 A1 Jul. 29, 2021

Related U.S. Application Data

(60) Provisional application No. 62/964,703, filed on Jan. 23, 2020.

(51) Int. Cl.
*A62B 23/02* (2006.01)
*A62B 18/00* (2006.01)
(Continued)

(52) U.S. Cl.
CPC ............ *A62B 23/02* (2013.01); *A62B 18/006* (2013.01); *A62B 18/025* (2013.01); *A62B 18/10* (2013.01)

(58) Field of Classification Search
CPC ........... A62B 18/08; A62B 9/00; A62B 9/006; A62B 18/088; A62B 17/006; A62B 18/04;
(Continued)

(56) References Cited

U.S. PATENT DOCUMENTS 2,291,603 A * 8/1942 Barker .................. F16K 15/148 137/512.15
2011/0126828 A1* 6/2011 Wu ......................... B03C 3/155 128/205.12

(Continued)

FOREIGN PATENT DOCUMENTS

CN 203777531 U * 8/2014
CN 104162236 A * 11/2014

(Continued)

OTHER PUBLICATIONS

English translation for CN 106213623, machine translated by Search Clarivate analytics, translated on Apr. 6, 2023.*

(Continued)

*Primary Examiner* — Tu A Vo
(74) *Attorney, Agent, or Firm* — QUANTUM PATENT LAW FIRM; Seongyoune Kang

(57) ABSTRACT

A filtering mask assembly includes a housing including a fan and an outlet valve. A filter is releasably mounted onto the housing and is adapted to substantially follow a shape and contour of the housing to seal the housing. A face seal is interposed between the wearer's face and the housing to provide a resilient conformity to the wearer's face when the mask assembly is worn. The mask assembly defines an inner space between the mouth and nose of the wearer and an inner side of the mask assembly, and an intermediate space between the housing and the filter and an outer space separated from the inner space by an outer side of the mask assembly. The fan is positioned on a downstream side of the filter to draw air through the filter. The mask assembly prevents the breathing of any air which has not passed through the filter.

18 Claims, 5 Drawing Sheets

(51) Int. Cl.
*A62B 18/02* (2006.01)
*A62B 18/10* (2006.01)

(58) Field of Classification Search
CPC ....... A62B 18/006; A62B 18/00; A62B 23/00; A62B 7/00; A62B 7/10; A62B 17/00; A62B 17/04; A62B 18/003; A62B 23/02; A62B 18/045; A62B 18/025; A41D 13/0025; A41D 13/1153; A42B 3/046; A42B 3/286
See application file for complete search history.

(56) References Cited

U.S. PATENT DOCUMENTS

| | | | | |
|---|---|---|---|---|
| 2012/0199130 | A1* | 8/2012 | Euvrard | A62B 18/025 128/206.17 |
| 2012/0266873 | A1* | 10/2012 | Lalonde | A61M 16/0063 128/205.24 |
| 2013/0104733 | A1* | 5/2013 | Bangera | A62B 23/025 128/206.12 |
| 2015/0034098 | A1* | 2/2015 | Schumacher | A41D 13/1138 128/863 |
| 2015/0053206 | A1* | 2/2015 | Seppala | A62B 18/10 128/206.17 |
| 2015/0290478 | A1* | 10/2015 | Curran | A62B 18/02 128/205.27 |
| 2016/0317848 | A1* | 11/2016 | Zilberstein | B03C 3/70 |
| 2017/0189727 | A1* | 7/2017 | Hunter | A62B 18/006 |
| 2018/0185677 | A1* | 7/2018 | Curran | A62B 9/02 |
| 2018/0236275 | A1* | 8/2018 | Song | A62B 18/10 |
| 2019/0275359 | A1* | 9/2019 | Shen | A62B 18/08 |
| 2020/0206546 | A1* | 7/2020 | Kim | A62B 23/025 |
| 2021/0106976 | A1* | 4/2021 | Böhringer | B01J 20/28011 |

FOREIGN PATENT DOCUMENTS

| | | | | | |
|---|---|---|---|---|---|
| CN | 105935472 | A | * | 9/2016 | |
| CN | 106213623 | A | * | 12/2016 | A41D 13/1107 |
| CN | 205884737 | U | * | 1/2017 | |
| CN | 106823181 | A | | 6/2017 | |
| CN | 207040968 | U | | 2/2018 | |
| CN | 207050120 | U | | 2/2018 | |
| CN | 207151982 | U | | 3/2018 | |
| CN | 107899145 | A | * | 4/2018 | |
| CN | 108261703 | A | * | 7/2018 | A62B 23/02 |
| CN | 207575573 | U | | 7/2018 | |
| CN | 108837342 | A | * | 11/2018 | A62B 23/00 |
| GB | 2050530 | A | * | 1/1981 | F01D 5/20 |
| KR | 20180009326 | A | * | 1/2018 | |
| WO | 2018058421 | A1 | | 4/2018 | |
| WO | WO-2020039080 | A1 | * | 2/2020 | A41D 13/1107 |

OTHER PUBLICATIONS

English translation for CN 104162236, machine translated by Espacenet.com, translated on Apr. 4, 2023.*
English translation for CN 108837342, machine translated by Espacenet.com, translated on Apr. 5, 2023.*
English translation for CN 105935472, machine translated by Espacenet.com, translated on Apr. 5, 2023.*
English translation for CN 203777531, machine translated by Search Clarivate analytics, translated on Apr. 6, 2023.*
English translation for CN 108261703, machine translated by Search Clarivate analytics, translated on Apr. 6, 2023.*
English translation for CN 107899145, machine translated by Search Clarivate analytics, translated on Apr. 6, 2023.*
English translation for CN 205884737, machine translated by Search Clarivate analytics, translated on Apr. 6, 2023.*

* cited by examiner

FILTERING MASK ASSEMBLY

CROSS-REFERENCE TO RELATED APPLICATIONS

This application claims the benefit of U.S. Provisional Patent Application No. 62/964,703, filed Jan. 23, 2020, which is incorporated by reference herein in its entirety.

FIELD OF THE INVENTION

This invention relates generally to the field of mask assemblies and in particular to mask assemblies which facilitate filtering of unwanted pollutants present in the breathed air. More particularly, the invention relates to a filtering mask assembly configured to be placed over the mouth and nose of face of the wearer, to a fan for a filtering mask assembly and to a method of assembling a filtering mask assembly.

BACKGROUND OF THE INVENTION

The increased air pollution around the world, and especially in big cities, has become a public health priority and wearing a filtering respiratory mask is known to provide adequate protection against pollutants to mask wearers. Except for trade professionals (such as, for example, builders, painters, carpenters) who are required to wear a mask whilst working, there is no mass adoption of filtering respiratory masks by individual users (such as regular members of the public who are cycling or walking), even in locations where the level of pollution may be considered hazardous.

Existing designs of anti-pollution masks, whether disposable or reusable, suffer from several shortcomings: the masks may not fit the face very well, hence causing leaks; the mask fit is not very comfortable to the wearer, and the filter medium may require exhausting breathing effort.

Additionally, the air space inside the mask, during and after exhalation, has high levels of humidity and elevated temperatures, which cause discomfort to the wearer's skin inside the mask. Moreover, an elevated $CO_2$ level (i.e., the $CO_2$ present in exhaled air) may cause temporary dizziness to the mask wearer when the mask volume is significant in relation to the breath tidal volume.

Although several face masks have been proposed which incorporate an integrated fan to assist breathing, they are often too bulky, heavy, and generate unacceptable level of noise and vibration. Furthermore, the weight and the electrical consumption of these fan units are not appropriate for use in a portable device, such as a filtering respiratory mask.

Prior art filtering respiratory masks are known for trade professionals, but they tend to be bulky and heavy, particularly when those masks comprise integrated fan and power supply units. WO 2016/150214 addresses this problem with integrated heavy fans by proving wind-wheel fans to assist the wearer when breathing in, but it is unclear whether the power supply of such masks is portable by the mask wearer or integrated within the mask. Moreover, WO 2015/149591 discloses the use of huge centrifugal fans placed at the lower portions of the mask and it appears that the filter is placed after the centrifugal fan, thus large quantities of unfiltered air are drawn through the filter (as compared to the wearer drawing in the air through the filter). Furthermore, WO 2017/065853 discloses the integration of two centrifugal fans on the side of the mask. The fans are specifically designed for this mask application. The energy consumption of the fans is high, and the power supply could not be portable. A battery then must be worn by the user and a power cable connects the mask and the battery.

A disadvantage of the existing filtering respiratory masks placed over the mouth and the nose of the face of the wearer is that the masks often create unbearable discomfort (due to the exhaled hot air inside the mask causing condensation inside the mask and to the glasses of the wearers), do not fit the face properly and leave marks on the wearer's face and pose breathing difficulties to the wearers (due to the increased breathing effort required when inhaling air through a filtering material in order to compensate for reduced air flow through the filtering material).

The main problem to address is to design a fan unit (within constraints dictated by size, electrical consumption and noise) which is able to help the wearer overcome the pressure drop induced by a good filter medium, typically 7 mm (or 0.3-inch) to 12 mm (or 0.5-inch) $H_2O$, whilst still maintaining the necessary volume of air to support breathing at rest of about 6 litres per minute and 28 litres per minute when commuting by bicycle.

The present invention discloses a new filtering mask assembly configured to be comfortably placed and worn over the mouth and nose of a wearer and a new fan suitable to be integrated within the new filtering mask assembly.

PROBLEM TO BE SOLVED BY THE INVENTION

There is a need for improvements in filtering respiratory mask assemblies which increase the comfort of wearing and promote effortless breathing of individual, non-trade professionals (both at rest and during moderate exercise or cycling), whilst expelling substantially all the exhaled air from the inner space of the mask assembly.

It is an object of this invention to provide a filtering mask assembly comprising a face seal providing resilient conformity to the wearer's face and a 'breath-ease' fan positioned on a downstream side of a filter to draw air through the filter, the mask assembly being versatile, low-cost and efficient to manufacture.

SUMMARY OF THE INVENTION

In accordance with a first aspect of the invention, there is provided a filtering mask assembly configured to be placed over the mouth and nose of the face of a wearer, the mask assembly comprising:

(a) a housing comprising a fan and an outlet valve;

(b) a filter releasably mounted onto the housing and adapted to substantially follow a shape and contour of said housing to seal the housing from the environment;

(c) a face seal interposed between the wearer's face and the housing to provide a resilient conformity to the wearer's face when the mask assembly is worn;

the filtering mask assembly defining an inner space between the mouth and nose of the wearer and an inner side of the mask assembly, an intermediate space between the housing and the filter and an outer space separated from the inner space by an outer side of said mask assembly, wherein the fan is positioned on a downstream side of said filter to draw air through said filter, and wherein, when in use, the outlet valve is adapted to open to expel substantially all the exhaled air from said inner space to said outer space when air pressure inside said inner space is greater than air pressure is said outer space and to remain closed when the pressure in the inner space is lower than the pressure in said outer space, thereby preventing the breathing of any air which has not passed through said filter.

In a second aspect of the invention, there is provided a fan for a filtering mask assembly, the fan comprising a fan casing having an air inlet and an air outlet coaxially opposite the air inlet opening, wherein the fan generates a pressure increase from the inlet towards the outlet to compensate for a pressure drop through a filter of the filtering mask assembly.

In a third aspect of the invention, there is provided a filtering mask assembly comprising a fan as disclosed above in relation to the first aspect of the invention.

In a fourth aspect of the invention, there is provided a method of assembling a filtering mask assembly, the method comprising (a) providing a housing;

(b) releasably inserting into the housing a fan, an outlet valve and at least one power source for powering the fan;

(c) providing a filter; and (d) releasably clipping the housing and the filter together.

In a fifth aspect of the invention, there is provided a method of providing wearers having varied facial characteristics with a filtering mask assembly, the method comprising providing a first face seal according to a first design and at least one other face seal according to at least one other second design, the first design being sized to fit a face having a first set of facial characteristics and the at least one other second design being sized to fit a face having a second set of facial characteristics.

Advantages of the Invention

The filtering mask assembly of the invention provides a versatile and modular mask assembly whose constituent parts (face seal, housing, fan, filter, outlet valve, power supply, etc) are designed to be clipped together to ease disassembly and replacement.

Moreover, the filtering mask assembly incorporates an electrically powered 'breathe-ease' fan which produces a pressure differential within the mask which reduces the breathing effort (breathing both at rest and when cycling) required from the user when breathing through a filter medium. The fan of the invention provides the required pressure differential at low rotation speeds which sustain low levels of noise and vibration during use. This provides a high degree of comfort to the wearer.

DETAILED DESCRIPTION OF THE INVENTION

Figure 1:
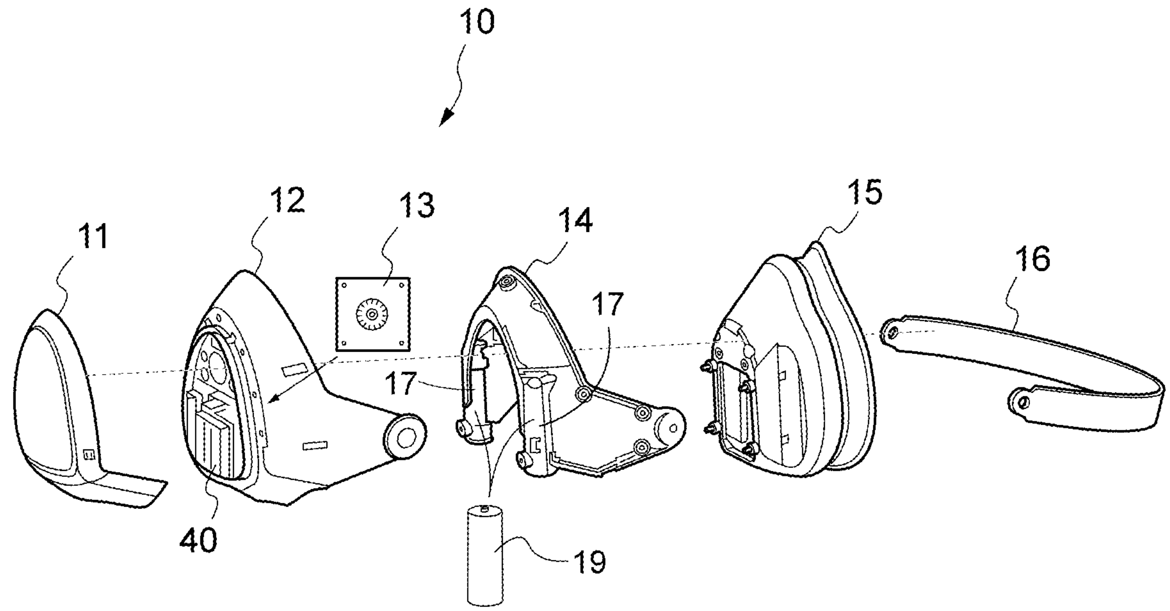
FIG. 1 is an elevated (side and front) view of a filtering mask assembly of one embodiment of the first aspect of the present invention.

The invention provides for a filtering mask assembly configured to be placed over the mouth and nose of the face of a wearer. The filtering mask assembly comprises a housing comprising a fan and an outlet valve; a filter releasably mounted onto the housing and adapted to substantially follow a shape and contour of the housing to seal the housing from the environment and a face seal interposed between the wearer's face and the housing to provide a resilient conformity to the wearer's face when the mask assembly is worn. The filtering mask assembly defines an inner space between the mouth and nose of the wearer and an inner side of the mask assembly, an intermediate space between the housing and the filter and an outer space separated from the inner space by an outer side of said mask assembly.

The fan is positioned on a downstream side of the filter to draw air through the filter to the inner space of the mask assembly. The fan then further blows the air inside the mask around the mouth of the wearer so as to reduce the discomfort due to warm and humid air caused by exhalation. Positioning the fan on a downstream side of the filter has the advantage of preventing soling the fan by inhaled pollutants.

Furthermore, locating the fan on a downstream side of the filter assists the mask wearer during breathing by compensating for the pressure drop due to breathing through a filtering material. At rest the fan would need to produce 0.33 litres per second airflow to support the facemask wearer, which is about 20 liters per minute airflow. When the wearer is commuting by bicycle the fan would need to produce 0.8 litres per second airflow to support the wearer, which is about 50 litres per minute airflow.

The outlet valve of the filtering mask assembly is adapted to open to expel substantially all the exhaled air from the inner space to the outer space when air pressure inside the inner space is greater than air pressure is the outer space. The opening of the outlet valve provides a discharge channel for exhaled air to the space outside the mask (i.e., to the environment), whilst preventing exhaled air from going back through the filter.

The outlet valve is also adapted to remain closed when the pressure in the inner space is lower than the pressure in the outer space, thereby preventing the breathing of any air which has not passed through the filter.

The housing may comprise a main frame and an internal chassis, the internal chassis being adapted to be releasably mounted onto the main frame. Alternatively, the housing may only comprise a main frame. In either housing embodiment, the housing itself is further adapted to be releasably mounted onto the filter and the face seal.

The face seal comprises a brim, a front wall having an opening facing the mouth and nose of said wearer and a bridging section between the brim and the front wall, wherein the bridging section resiliently deforms when pressed against the wearer's face, thereby providing a resilient conformity to the wearer's face when the mask assembly is worn. Preferably, the bridging section resiliently folds when pressed against the wearer's face such that the brim flattens against the face. This ensures that the face seal adheres tightly against the surface of the wearer's face, especially on the upper area around the nose which is known to contribute significantly to inward leakage of non-filtered air.

In a preferred embodiment, the face seal is releasably mounted onto the housing. This ensures that the face seal is easily replaced, particularly when the same mask assembly is likely to be worn by different users with different facial characteristics.

The face seal is made of a soft resilient material. The advantage of using a soft material is that the face seal conforms well to the contours of the wearer's face, particularly in the nose and mouth areas of the face. Furthermore, due to the soft resilience of the face seal material, the face seal may be made to fit different sizes and physical facial characteristics of wearers.

The face seal is made of any one of a thermoplastic elastomer or an elastomer. Preferably, the face seal is made of a thermoplastic elastomer, such as thermoplastic polyurethane (TPU) materials or polycarbonate materials, such as medical grade polymer materials. The polycarbonate materials are soft and resilient leaving negligible marks on the wearer's skin, are hypoallergenic, have strong acid and alkali resistance and are flame retardant. Furthermore, these materials have high temperature resistance and outstanding weathering properties. Preferably or alternatively, the face seal is made of an elastomer, such as silicone. Alternatively, the face seal is made of a thermoset liquid silicone rubber.

The housing comprises at least one power source for powering the fan. Preferably, the housing comprises at least one chamber, the at least one chamber being adapted to releasably hold the at least one power source. Preferably the chambers are side chambers of the housing. More preferably, the housing comprises two side chambers adapted to releasably hold the two power supplies. The provision of the two power supplies in the two side chambers enables a symmetrical weight distribution within the housing of the mask assembly. Furthermore, the integration of the power supplies within the sides of the housing does not obstruct the wearer's vision.

The at least one power source comprises at least one rechargeable power source. Preferably, the rechargeable power source comprises a rechargeable battery, such as a Li-Ion battery. The use of Li-Ion batteries protects the housing from overheating whilst the fan is in use.

The housing further comprises a charging point, such as an USB charging point, for charging the at least one power source. Preferably, the USB charging point may be placed at the bottom side of the housing to allow easy access by the wearer.

The fan is electrically connected to the at least one power source. The at least one power source is adapted to supply the fan with direct current electrical power. Preferably, the fan is supplied with 5V direct current. Alternatively, depending on the type and size of the fan, the fan may be supplied with 10V or more. The at least one battery may be a 3.7V battery (standard for Li-Ion batteries) and, when connected in series, two batteries provide more than the required 5V power supply required by the fan. Should the fan require 10V, then three batteries connected in series would be required.

When mounted in a chamber of the housing, the batteries are accessible by slightly moving the face seal to expose the batteries. The batteries are rechargeable and, in one embodiment, the batteries are Li-ion 14500 (AA) or 10440 (AAA) batteries. These batteries are easy to procure and replace and offer a high standard of safety and performance since they are protected against over-heating, over-pressure in the battery cell and over-charging. In a preferred embodiment, the housing comprises two batteries which can supply over 2 hours of electric power with all functions of the mask turned on.

The fan comprises a fan casing having an air inlet facing said filter and communicating with the intermediate space between the filter and the housing, and an air outlet coaxially opposite the air inlet and communicating with the inner space of the mask assembly, wherein the fan generates a pressure increase from the inlet towards the outlet to compensate for a pressure drop through the filter. Thus, the aids the wearer to overcome the pressure drop induced by a good filter medium, the pressure drop being from 7 mm (or 0.3-inch) to 12 mm (or 0.5-inch) $H_2O$. Therefore, the required volume of air to be generated by the fan is 0.3 litres per second when at rest and 28 litres per minute during inhalation when steadily cycling.

An inner diameter of the fan casing is adapted to taper from the inlet towards the outlet to generate a pressure increase from the inlet towards the outlet to compensate for a pressure drop through the filter. Thus, the inhaled air 'rushes' from the inlet towards the outlet and compensates for a pressure drop through the filter. Preferably, the tapering is from a first inner diameter of the fan casing at the inlet end of the casing to a second, larger inner diameter of the fan casing near the outlet end of the casing.

The fan further comprises a fan rotor. Preferably, the fan rotor is adapted to generate a pressure increase of between 5 to 18 mm water gauge with flow rates between 0.25 to 1.5 liters per second. Preferably, the fan rotor operates in a range of between 4000 to 7000 rpm. Even more preferably, the fan rotor operates at 6000 rpm, most preferably at 5700 rpm. The low fan rotation speeds ensure an acceptable level of fan noise, vibration and electrical power consumption.

The fan rotor comprises an electric motor incorporated within the volume of the fan casing. This configuration reduces the overall volume of the fan. The motor comprises electronic protection against reverse polarity and against stall conditions (caused by the motor being jammed). The fan rotor further comprises fan blades. Many enhancements in the shape of the fan blades and the fan housing could be contemplated to reduce the size and weight of the fan, to lower electrical consumption, to lower the fan speed, and to reduce vibration and noise, thus improving the mask wearer's comfort.

Alternatively and/or additionally, the fan further comprises a regenerative pump unit.

The fan further comprises at least one protection mesh adapted to be placed either in front of either or both of the air inlet or the air outlet. Preferably, the protection mesh is a protection grid. The protective mesh or grid avoids possible rotor blade damage from foreign objects. When of sufficiently small aperture size, the mesh or grid obviates the risk of damage to the wearer's fingers when the fan is running.

The fan is a mixed-flow fan. Mixed-flow fans are low-volume and high-pressure fans which output a substantially unidirectional air flow. Alternatively, the fan is a centrifugal or an axial fan. Preferably, the fan comprises a photocatalysis process sub-assembly to completely eliminate all volatile organic compounds (VOCs) from the filtered air before it enters the inner space of the mask assembly.

The fan casing has a diameter of less than 60 mm and a thickness of less than 20 mm. Preferably, the fan casing has a diameter of 57 mm and a thickness of 15 mm.

The housing of the filtering mask assembly comprises at least one sensor assembly for measuring concentrations of pollutants in either or both of the inner space or the outer space of the mask assembly. Preferably, the at least one sensor assembly comprises at least one air sensor assembly for measuring air pollutants such as carbon monoxide, carbon dioxide, nitrogen oxides, sulphur dioxides, and ozone. The pollutants are measured at ppm (parts per million) level.

Alternatively and/or additionally, the at least one sensor assembly comprises optical gas detectors, such as infrared (IR) or ultraviolet (UV) gas detectors. These are reliable and robust detectors. In one embodiment, the housing comprises a measurement chamber made of metal gratings that include optical sensors and light sources. The light sources may be IR light sources or LED (Light Emitting Diode) sources.

In use, the light sources illuminate the volume of air that entered the measurement chamber with several wavelengths and then the absorption of each gas present in the chamber displays a specific absorption wavelength. The amount of absorption is measured by the optical detector and then corelated to the concentration of the gases present inside the measurement chamber.

Alternatively or additionally, the at least one sensor assembly may comprise other sensing technologies such as MEMS (Micro Electro-Mechanical Systems) or electrochemical sensors.

Preferably, the housing of the filtering mask assembly comprises two sensor assemblies—one sensor assembly may be placed within the inner space to measure the air pollutant concentration of the filtered air and the other sensor assembly may be placed on the outer side of the mask assembly to measure the ambient air pollution. This two-sensor assembly configuration enables the wearer to know whether the filter works effectively by comparing the quality of the filtered air with the quality of the ambient air pollution. Thus, it helps the wearer take the best decision as to whether to stay or leave a certain geographical location.

The data collected by means of the at least one sensor assembly (such as, for example, gas pollutant index, temperature or GPS position data) is timestamped and encrypted by a microprocessor (also releasably secured to the housing of the filtering mask assembly). In a preferred embodiment, the encrypted data may be transferred by Bluetooth to a terminal application software. The encrypted signature of the data may be broadcasted to a stream data blockchain, while the data is stored in a decentralized database such as Inter Planetary File System (IPFS). In this configuration, the data could be monetized in data decentralized marketplaces.

The housing of the filtering mask assembly may further comprise at least one integrated printed circuit board (PCB). The PCBs may be releasably secured to either or both of the inner or outer side of the housing. In a preferred embodiment, the PCBs are clipped to the housing and the different parts of the PCB are connected without wires. To incorporate all the necessary electronics, the semi-flexible PCBs may reach a surface area of about 6000 $mm^2$.

The integrated PCBs may include a microprocessor and various electronic components which may be controlled by the microprocessor. A non-exhaustive list of electronic components may include, but not be limited to, air sensor assemblies, a Global Positioning System (GPS) circuit, an accelerometer sensor, lights, an audio system including a microphone, headphones, and a speaker, the fan, and a connecting module to be paired to a terminal. In some embodiments, the connecting module includes, for example, a Bluetooth module to exchange data and voice or a Near Field Communication (NFC) module.

The terminal may run a software application to collect and report the data measured by the sensor assemblies. In a preferred embodiment, the terminal is a smartphone that enables the Bluetooth function to connect to the so-called 'smart' filtering mask assembly to allow the wearer to safely have a phone conversation or listen to music whilst wearing the mask assembly.

The audio system ensures a high level of safety to the wearer. The integrated speaker may be used when the wearer would like to speak on the phone without removing the filtering mask assembly. To allow the sound to diffuse, the speaker component is placed on the PCB next to openings on the housing of the filtering mask assembly. The headphones, for example, may use the bone conduction technology to convey the sound across the skull bones to the internal ear. In such a case the wearer's ears are not obstructed by a headset and allow the user to be alert of the dangers around them, especially in a busy urban area.

The filtering mask assembly may further comprise a command button. The command button may be placed on the outside of the housing and, when wearing the 'smart' filtering mask assembly, the wearer would not be able to see the command button. Thus, the command button may be designed to allow the wearer to use the button without having to take the mask assembly off their face. The ergonomics (shape) and the feel and touch of the surface of the command button may be designed to provide enough information to the wearer to command the smart functions of the mask accurately and with ease. In a preferred embodiment, the command button may consist of five (5) buttons (or button components). The buttons may be designed to have emboss shapes on their surfaces to assist the wearer in differentiating them by the sense of touch from fingertips. For example, in a preferred embodiment, one of the buttons may have an emboss rounded rectangle, whilst another one of the buttons may have circle dots embossed on its surface. Furthermore, the buttons may be designed to have sufficient gaps between one another to provide as additional tactile information to the wearer to enable them to navigate amongst the buttons with increased accuracy.

Additionally or alternatively, to enable the distinction in the sense of touch on the surface of the buttons, sounds may be associated with each or some of the buttons. The sounds may be conveyed by the audio system to better inform the wearer on what action is being taken.

The command button functions may allow the wearer, but are not limited to, to turn on/off the 'smart' mask assembly, to pair the mask assembly with a smartphone by Bluetooth, to accept or reject incoming phone calls, and to adjust sound volume. For safety reasons, some functions such as triggering outgoing calls, play/pause/stop music, or voice command are to be actioned from the connected smart device, such as a smartphone.

The outlet valve of the filtering mask assembly is a one-way valve. Thus, the valve opens when the pressure in the inner space of the mask assembly is greater than the ambient pressure, therefore providing a discharge channel for substantially all the exhaled. Consequently, the exhaled air is not allowed to go backwards through the filter. Furthermore, the valve remains closed, or stays substantially flat, when the wearer is inhaling or whenever the pressure in the inner space of the mask assembly is lower than the ambient pressure, thereby preventing the breathing of any air which has not passed through the filter.

The outlet valve comprises a valve body occluding an aperture in the housing and at least one prong protruding outwardly from the valve body for releasably securing the outlet valve to the housing. This simple construction of the outlet valve allows ease of disassembly and replacement.

The releasably securing means of the outlet valve comprise pivoting means. Thus, the outlet valve can quickly reassume a closed position at the end of a breathing cycle. In a preferred embodiment, the valve body may be of circular shape (i.e., a disc) or of a rectangular shape, either shape being fixed to the housing via a prong. The valve opening and closing may be effected by the disc or the rectangular body pivoting around the prong to expose an aperture in the mask assembly housing.

The filter of the filtering mask assembly comprises at least one filter layer. Preferably, the filter is a multi-layer filter which blocks particulate pollution varying from PM10 to PM2.5 and smaller, as well as adsorbing gas pollutants. The filter may further have different air filtering characteristics imposed by the selection of filter materials which may address the wearer's needs in days of light or heavy air pollution or depending upon the pollution produced by the various work environments.

In a preferred embodiment, the filter meets any one of the EN143 P1, P2, P3 standards for reusable facemask filters, and any one of NIOSH N95, N99, N100 standards for reusable mask filters.

The filter is releasably mounted onto the housing and adapted to substantially follow a shape and contour of the housing to seal the housing from the environment. This filter design maximises the size of the filter to ensure maximum filtration surface, hence increasing air breathing comfort and reducing air moisture build up. In a preferred embodiment, the filter may be taken out for replacement by sliding the filter down vertically. The mask assembly is reusable, whilst the filters are accessories (which can be easily replaced when saturated with pollutants).

The filter may be located at a suitable separation distance from the air inlet of the fan casing to keep the filter from obstructing the fan.

The at least one of the at least one filter layers comprises activated carbon or other gas-blocking filtering materials.

The filtering mask assembly is a modular mask assembly whereby the housing, the filter, the fan and the outlet valve are releasably clipped together to form the mask assembly.

The filtering mask assembly further comprises a harness strap which supports the fully assembled mask assembly on the wearer's head and around the neck (instead of being fixed onto the ears which often causes discomfort). The harness strap comprises a set of hooks which are to be fastened on emboss circles built into both outer sides of the housing. This harness strap design allows the wearer to open and close the neck strap on the side at cheek level, which is easier, faster, and more comfortable than strapping on the back of the head.

The harness strap is made of a nylon material. Nylon presents good durability against abrasion. Preferably or alternatively, the harness strap may be made of hemp or flax. These materials are advantageous when the wearer is allergic to nylon or another man-made textile.

The harness strap comprises a buckle which may be integrated at a middle point of the harness strap for the wearer to adjust the length of the strap, whilst providing symmetric support on the back side of the head. In a preferred embodiment, a cotton pad is attached onto the side of the buckle which is in contact with the head to avoid discomfort to the wearer from the buckle's material.

The invention further provides for a fan for a filtering mask assembly, the fan comprising a fan casing having an air inlet and an air outlet coaxially opposite the air inlet opening, wherein the fan generates a pressure increase from the inlet towards the outlet to compensate for a pressure drop through a filter of the filtering mask assembly.

An inner diameter of the fan casing is adapted to taper from the inlet towards the outlet to generate a pressure increase from the inlet towards the outlet to compensate for a pressure drop through the filter of the filtering mask assembly.

The fan further comprises a fan rotor, wherein the fan rotor is adapted to generate a pressure increase of between 5 to 18 mm water gauge with flow rates between 0.25 to 1.5 litres per second. The fan rotor operates in a range of between 4000 to 7000 rpm. Preferably the fan rotor operates at 6000 rpm, more preferably at 5700 rpm.

The fan is a mixed-flow fan. Alternatively, the fan is a centrifugal fan. Alternatively, the fan comprises a regenerative pump unit.

The invention further provides for a method of assembling a filtering mask assembly, the method comprising (a) providing a housing;
(b) releasably inserting into the housing a fan, an outlet valve and at least one power source for powering the fan;
(c) providing a filter; and
(d) releasably clipping the housing and the filter together.

The invention further provides a method of providing wearers having varied facial characteristics with a filtering mask assembly, the method comprising providing a first face seal according to a first design and at least one other face seal according to at least one other second design, the first design being sized to fit a face having a first set of facial characteristics and the at least one other second design being sized to fit a face having a second set of facial characteristics.

The invention will now be described in more detail, without limitation, with reference to the accompanying Figures.

FIG. 1 shows a filtering mask assembly according to an embodiment of the invention whereby the housing comprises a main frame and an internal chassis. In FIG. 1 a filtering mask assembly 10 comprises a filter 11, a main frame 12, a fan 13, an internal chassis 14, a face seal 15 and a harness strap 16. The internal chassis 14 has two chambers 17 on the two sides of the chassis to hold two portable power supplies 19. The main frame 12 has one main opening in the centre to support the fan 13.

When assembled for use by the wearer, all parts of the mask assembly 10 are fixed to each other without screws, i.e. by clipping them together. The parts are designed to be clipped to ease the disassembly of the filtering mask assembly 10. Additionally, the integrated electronics of the smart mask (PCB) (not shown) is also clipped to the outer side of the internal chassis 14 and may require one or two screws to secure the fragile components of the PCB onto the internal chassis 14.

With the harness strap secured tightly against the wearer's head, the components of the mask assembly are securely held in place ready for use by the wearer. In use, air is inhaled through the filter and then, supported by the fan, the airflow is moving easily from the environment across the filter to the inner space of the mask assembly. The filtered air is inhaled by the wearer from the inner space and the exhaled air is expelled through the outlet valve to the environment. The mask is powered on through the command button and the smart functions of the mask assembly are also controlled by the wearer through the command button.

Figure 2:
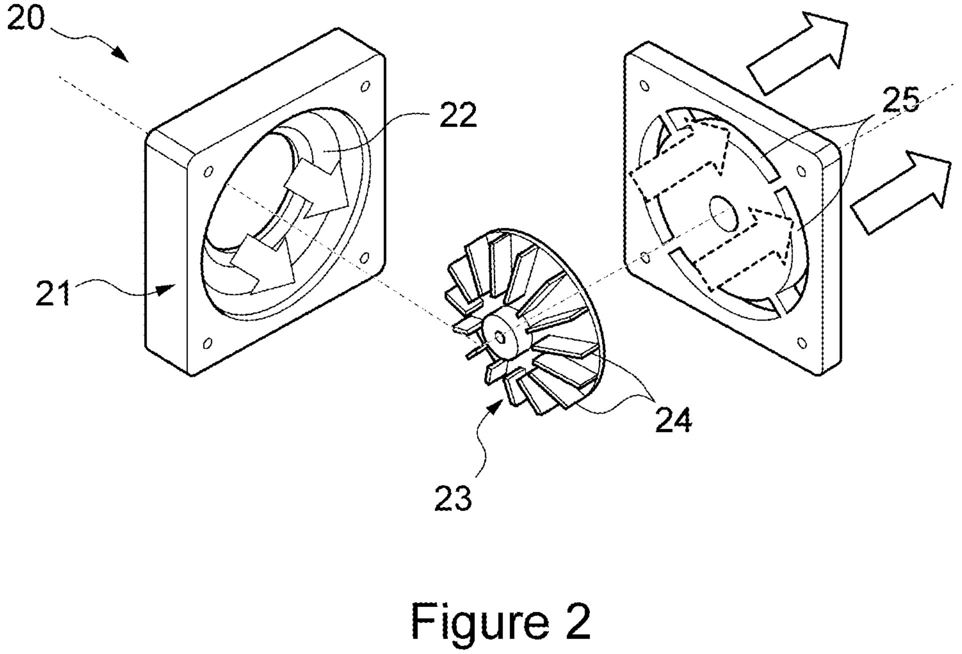
FIG. 2 is an elevated (side and front) view of a fan of one embodiment of the second aspect of the present invention.

FIG. 2 shows a fan 20 comprising a fan casing 21 having an air inlet 22 facing the filter 11 (of FIG. 1) and communicating with the intermediate space between the filter 11 and the main frame 12, and an air outlet 25 (consisting of several openings 25), the air outlet 25 being coaxially opposite the air inlet and communicating with the inner space of the mask assembly. The fan 20 further comprises a fan rotor 23 with several blades 24. The fan rotor 23 also incorporates the motor (not shown). In this embodiment the fan 20 is a low-volume and high-pressure mixed-flow fan producing a substantially unidirectional air flow.

An inner diameter of the fan casing 21 is adapted to taper from the inlet 22 towards the outlet 25 to generate a pressure increase from the inlet 22 towards the outlet 25 to compensate for a pressure drop through the filter.

Referring to FIG. 2, air enters the fan 20 via the inlet opening 22 and is accelerated to a high rotational speed by the fan rotor 23 to produce the pressure desired at the periphery of the fan housing 21. The air then emerges via the air outlets 25 in an axial manner into the inner space inside the mask assembly 10. The motor runs at 5700 rpm from a 3.7V DC power supply and draws a current up to 1000 mA.

A protection mesh or grid (not shown) may be located in front of either or both of the air inlet 22 or the air outlet 25 to avoid possible damage to blades 24 of the fan rotor 23 by foreign objects. The protection mesh or grid is of sufficiently small aperture size to obviate the risk of damage to fingers when the fan is running. The filter 11 (shown in FIG. 1) is located at a suitable separation distance from the air inlet 22 to keep the filter from obstructing the fan.

When in use, the fan 20 (also shown as fan 13 in FIG. 1) draws air continuously or intermittently through the filter 11 as to assist the wearer's lungs to pull air through the filter medium. The effort required to overcome the pressure drop due to the air resistance of the filter medium is therefore reduced or completely eliminated by the suction capacity of the fan 20. Typically, the fan 20 aims to compensate for a pressure drop from 5 mm to 18 mm $H_2O$ depending upon the grade of the air filter 11.

A typical tidal volume for an adult male is around 0.5 litres, whilst at rest the breathing rate is about 12 breaths per minute, equal to an average of 6 litres per minute. But it is crucial to note that a breath cycle is asymmetrical: at rest the inhalation takes about 1.5 seconds, followed by exhalation at a reduced flow rate over a similar time, then a fallow period. Therefore, at rest the fan 20 would need to produce 0.33 litre per second airflow to support the facemask wearer, which is about 20 litres per minute airflow. When commuting by bicycle, which is the equivalent to undertaking moderate exercise, an adult would breathe about 56 times per minutes which represents an average of 28 litres per minute. The inhalation takes about 0.6 seconds, followed by exhalation and a much shorter fallow period. In this case the fan 20 would need to produce 0.8 litres per second airflow to support the wearer (50 litres per minute).

Compared to the fan 20 embodiment illustrated in FIG. 2, the inventors could contemplate several enhancements or improvements to the shape of the fan blades 24 and to the fan casing 21. The benefits of these enhancements or improvements would lead in reduced size and weight of the fan 20, lower electrical consumption resulting from higher aerodynamic efficiency, lower fan 20 speed, and reduced vibration and noise, thereby improving wearer comfort.

Figure 3A:
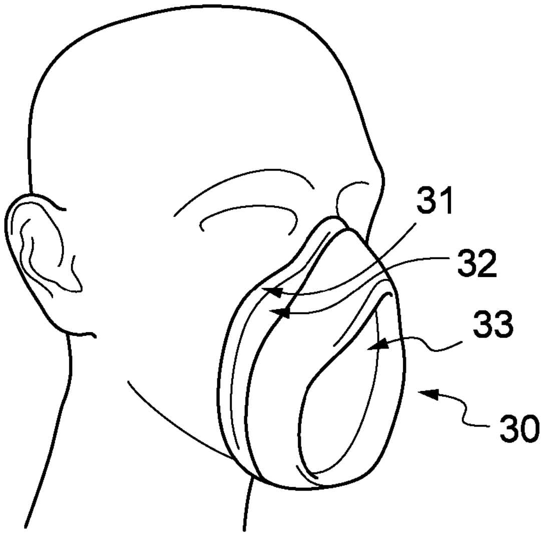
FIGS. 3*a* to 3*c* are elevated (side and front) views of a face seal of a filtering mask assembly of one embodiment of the first aspect of the present invention.
Figure 3B:
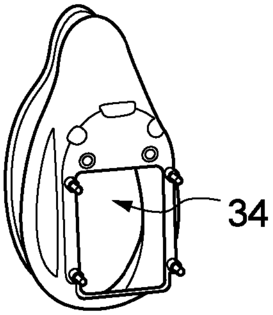
Figure 3C:
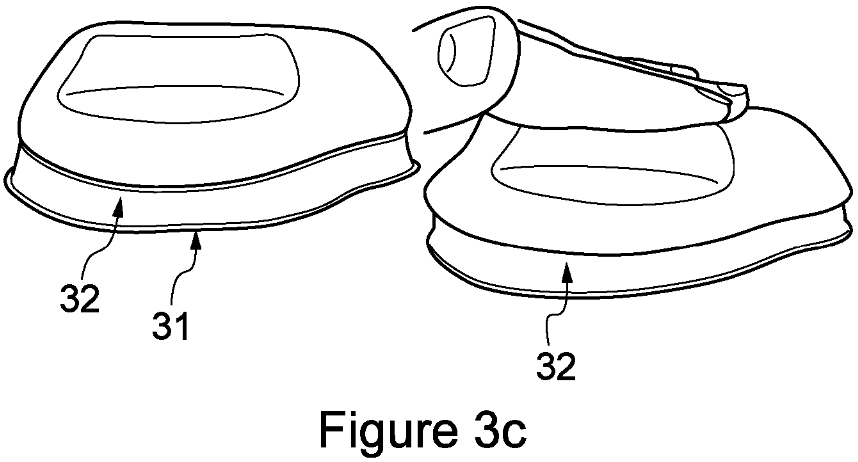

FIGS. 3*a* to 3*c* show the face seal 30 which comprises a brim 31 (best shown in FIGS. 3*a* and 3*c*), a front wall 33 having an opening 34 (shown in FIG. 3*b*) facing the mouth and nose of the wearer and a bridging section 32 (best shown in FIGS. 3*a* and 3*c*) between the front wall 33 and the brim 31, the bridging section 32 resiliently deforming when pressed against the wearer's face, thereby providing a resilient conformity to the wearer's face when the mask assembly 10 is worn. As shown in FIG. 3*c*, when in use, the bridging section 32 resiliently folds when pressed against the wearer's face such that the brim flattens against the wearer's face.

When the harness strap 16 (shown in FIG. 1) is locked and adjusted appropriately, it produces the necessary adherence of the face seal 30, especially on the upper area around the nose, known to contribute significantly to inward leakage of non-filtered air. The face seal 30 is pressed against the wearer's face and the bridging section 32 area folds under the front wall 33. The opening 34 in the front wall 33 allows the airflow drawn through the filter 11 with the assistance of the fan 20 to reach the inner space of the mask assembly next to the mouth and nose of the wearer. In a preferred embodiment, the face seal 20 is clipped to the main frame 12 and could be easily replaced. A set of face seals 20 may be made available to fit different sizes and physical facial characteristics of wearers' faces.

Figure 4A:
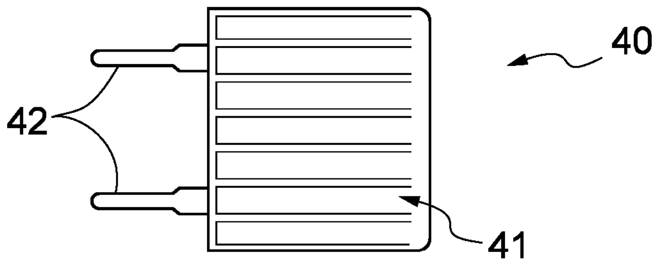
FIG. 4*a* is a front elevation view of an outlet valve of a filtering mask of one embodiment of the first aspect of the present invention.
Figure 4B:
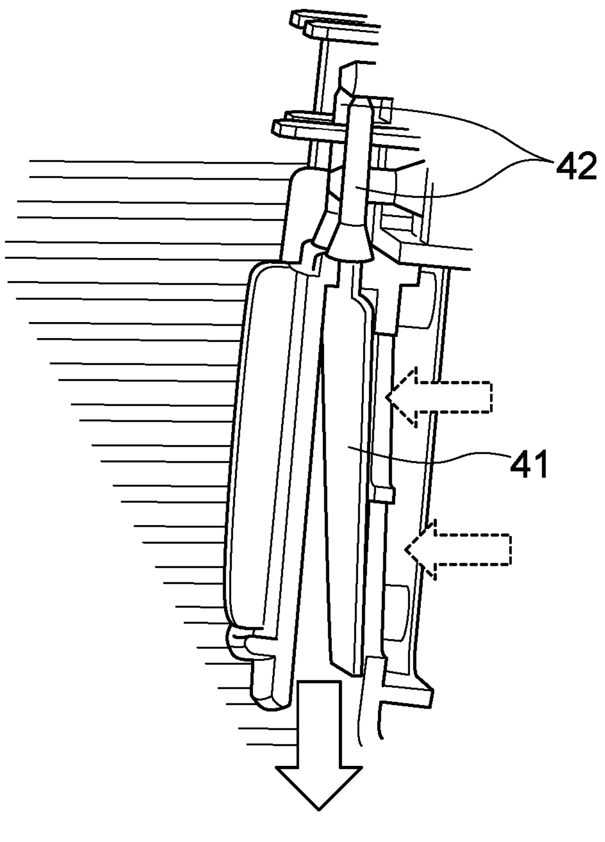
FIG. 4*b* is a cross-section view of the outlet valve of FIG. 4*a* depicted as clipped onto a housing of a filtering mask assembly of one embodiment of the first aspect of the invention.

FIGS. 4*a* and 4*b* show the outlet valve 40 which comprises a valve body 41 occluding an aperture in the main frame 12 and two prongs 42 protruding outwardly from the valve body 41 for releasably securing the outlet valve 40 to the main frame 12. The prongs 42 hold the outlet valve 40 into the main frame 12 in normal use, but also allow user replacement of the outlet valve 40.

In use, the outlet valve 40 opens when the pressure in the inner space of the mask assembly 10 is higher than ambient pressure, thereby providing a discharge channel for exhaled air to the outside and preventing air going backwards through the filter 11. The outlet valve 40 remains closed, or stays flat, when the wearer is inhaling and whenever the pressure in the inner space of the mask assembly 10 is lower than the ambient pressure, thereby preventing the breathing of any air which has not passed through the filter 11.

In a preferred embodiment, the expelled air is directed downward vertically so that the moisture and higher temperature of the exhalation misses the wearer's face. The continuous functioning of the fan 20 (FIG. 2) produces a certain pressure in the inner space of the mask assembly 10, so the thickness and rigidity of the outlet valve 40 are designed to allow a large volume of exhaled air to pass when a differential pressure is produced during the exhalation phase.

Figure 5:
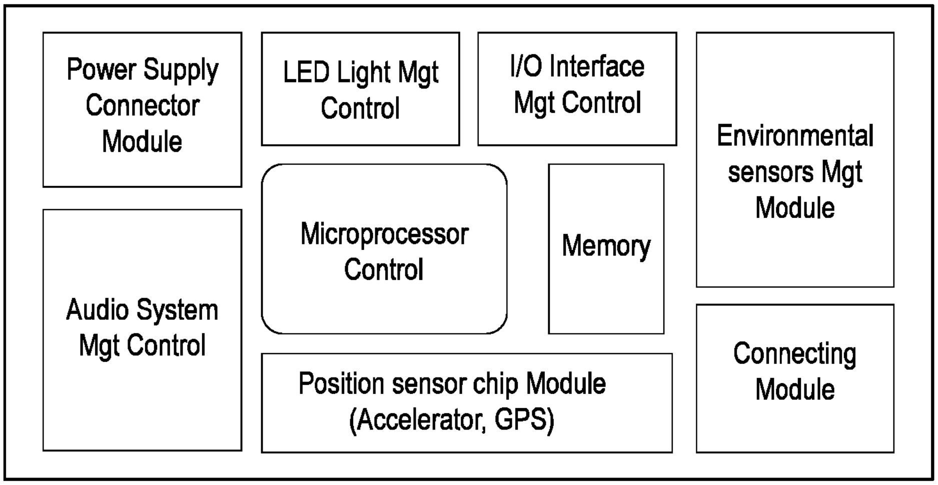
FIG. 5 is a layout view of a printed circuit board integrated into a housing of a filtering mask assembly of one embodiment of the first aspect of the invention.

FIG. 5 shows a layout view of a PCB integrated on the inner sides of either or both of the main frame 12 or internal chassis 14 of the mask assembly 10. In a preferred embodiment, the PCB elements are clipped to the main frame 12 and/or the internal chassis 14 and the different parts of the PCB are connected without wires. To incorporate the necessary electronics, the semi-flexible PCB could reach a surface of about 6000 $mm^2$.

The integrated PCB comprises a microprocessor and various electronics components. The microprocessor controls, for example, the air sensors, the Global Positioning System (GPS) chip, the accelerometer sensor, the lights, the audio system, the fan 20 and the connecting module to be paired to a terminal. In some embodiments, the connecting module includes, for example, a Bluetooth module to exchange data and voice, or a Near Field Communication (NFC) module. The terminal runs a software application to collect and report the data measured by the sensors. In a preferred embodiment, the terminal is a smartphone that enables the Bluetooth function to connect to the smart mask assembly 10 to allow the wearer to have a phone conversation or listen to music. The audio system (not shown) ensures a high level of safety to the wearer. The integrated speaker is used when the wearer would like to speak to someone without taking-off the particulate matter mask.

Figure 6:
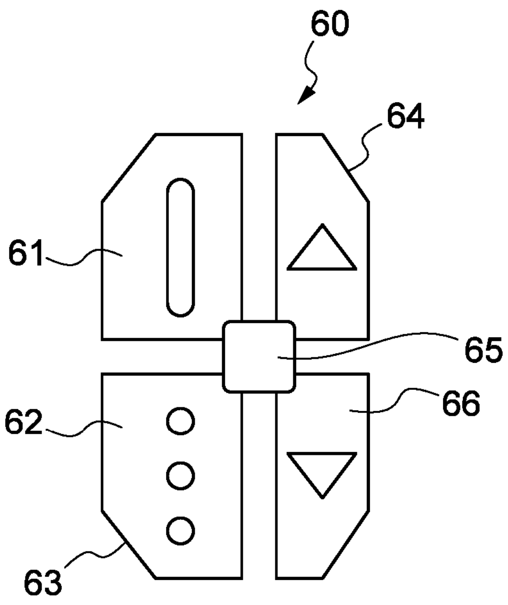
FIG. 6 is plan elevation view of a command button integrated into a housing of a filtering mask assembly of one embodiment of the first aspect of the invention.

FIG. 6 shows the command button 60, typically placed/clipped externally on one side of the main frame 12. When wearing the smart mask assembly 10, the wearer cannot see the command button 60. Thus, the command button 60 is designed to allow the wearer to utilise it without having to take off the mask assembly 10.

The ergonomics (shape) and the feel and touch of the surface of the command button 60 are designed to provide enough information to the wearer to command the smart functions of the mask assembly 10 accurately and with ease. The command button 60 consists of five components (FIG. 6). In a preferred embodiment, the buttons are designed to have emboss shapes on their surfaces to assist the wearer in differentiating between them by the sense of touch from fingertips. Button 61 has an emboss rounded rectangle and button 62 has 3 circle dots embossed on the surface. Buttons 64 and 66 both have an emboss triangle, whilst the middle button 65 adopts a dull finish texture on its surface. The four bigger buttons each have one distinctive cut-off corner 63 which collectively serve as a button-zone indicator.

Furthermore, the buttons are designed to have sufficient gaps between one another as additional tactile information for the wearer to navigate among the buttons accurately. Additionally to the distinction in the sense of touch on the surface of the buttons, sounds conveyed by the audio system (not shown) may be associated with some or each button 61, 62, 64, 65, 66 to better inform the wearer on what action is being taken.

The command button's 60 functions may allow the wearer, but are not limited to, to turn on/off the device, pair the device with a smartphone by Bluetooth for instance, accept or reject incoming phone calls, and adjust sound volume. For safety reasons, some functions such as triggering outgoing calls, play/pause/stop music, or voice command are to be actioned from the connected smart device, such as a smartphone.

Figure 7:
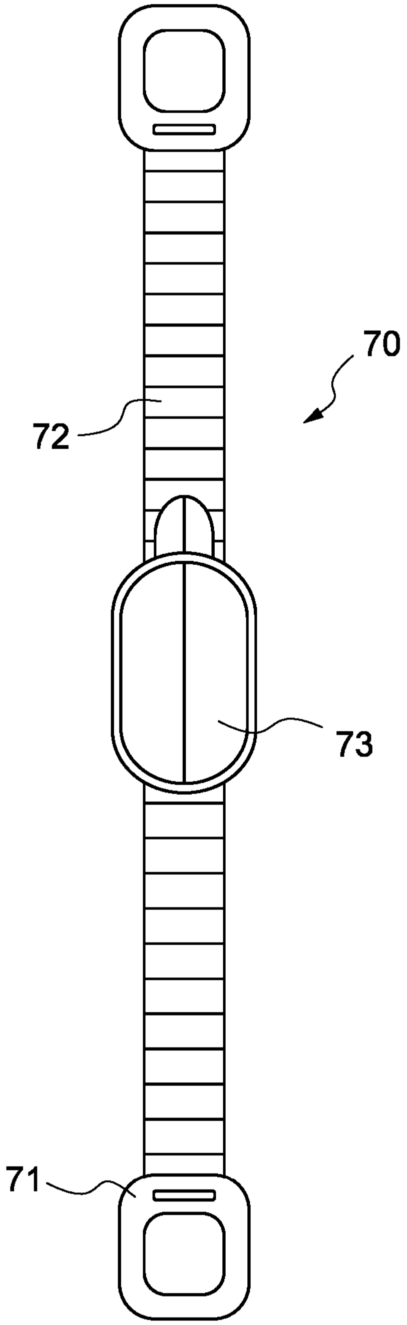
FIG. 7 is a plan elevation view of an embodiment of a harness strap which can be secured to a filtering mask assembly of one embodiment of the first aspect of the present invention.

FIG. 7 shows the harness strap 70 (shown as strap 16 in FIG. 1) which supports the fully assembled mask assembly 10 on the wearer's head and around the neck, instead of being fixed onto the ears which often causes discomfort. The hooks 71 are to be fastened on the emboss circles on both sides of the main frame 12 (FIG. 1). This design allows the wearer to open and close the neck strap on the side at cheek level. This is also easier, faster, and more comfortable than strapping on the back of the head. The strap 72 connects both hooks 71 and uses nylon as material for its durability against abrasion. Alternatively, the strap 70 may be made with hemp or flax in cases where the wearer is allergic to nylon or another man-made textile. A buckle 73 is integrated at the middle point of the strap 70 for the wearer to adjust the length of the strap 70, while providing symmetric support on the back side of the head. In a preferred embodiment, a cotton pad is attached onto the side of the buckle 73 which is in contact with the head to avoid discomfort from the buckle's 73 touch material.

The invention has been described with reference to a preferred embodiment. However, it will be appreciated that variations and modifications can be effected by a person of ordinary skill in the art without departing from the scope of the invention.

The invention claimed is:

1. A filtering mask assembly configured to be placed over a face of a wearer, the mask assembly comprising:

a housing;

a fan;

an outlet valve;

a filter mounted onto the housing and adapted to substantially follow a shape and contour of the housing to seal the housing from an exterior;

a face seal adapted to be interposed between the face of the wearer and the housing to provide a resilient conformity to the face of the wearer when the filtering mask assembly is worn, wherein the filtering mask assembly defines an inner space between a mouth and a nose of the wearer and an inner side of the filtering mask assembly, an intermediate space between the housing and the filter, and an outer space separated from the inner space by the filtering mask assembly, wherein the fan is positioned on a downstream side of the filter to draw air through the filter, and the fan comprises a fan casing having an inlet facing the filter and communicating with the intermediate space between the filter and the housing, and an outlet coaxially opposite the inlet and communicating with the inner space of the filtering mask assembly, wherein the fan further comprises a fan rotor having a circular plate and a plurality of elongated blades arranged on the circular plate, the fan further comprises an outlet plate, the outlet plate comprising a plurality of outlets that are coaxial with the inlet of the fan casing, each of the plurality of elongated blades extend from a first surface of the circular plate and each of the plurality of elongated blades are arranged radially and substantially perpendicular on the first surface of the circular plate, wherein each of the plurality of elongated blades comprises a length that extends between a central portion of the circular plate and a curved surface of the circular plate, and the plurality of elongated blades are positioned between the first surface and the inlet, and the circular plate further comprises a second surface that is opposite of the first surface, the second surface is configured to face an inner surface of the outlet plate, and wherein the fan is releasably attached to the housing, wherein an inner diameter of the fan casing is adapted to increase from the inlet towards the outlet to generate a pressure increase from the inlet towards the outlet to compensate for a pressure drop through the filter, and wherein, when in use, the outlet valve is adapted to open to expel substantially all exhaled air from the inner space to the outer space when air pressure inside the inner space is greater than air pressure in the outer space and to remain closed when the pressure in the inner space is lower than the pressure in the outer space, thereby preventing the breathing of any air which has not passed through the filter.

2. The filtering mask assembly of claim 1, wherein the housing comprises a main frame and an internal chassis, the internal chassis being adapted to be mounted onto the main frame.

3. The filtering mask assembly of claim 1, wherein the face seal comprises a brim, a front wall having an opening adapted to face the mouth and the nose of the wearer and a bridging section between the brim and the front wall, wherein the bridging section resiliently deforms when pressed against the face of the wearer, thereby providing a resilient conformity to the face of the wearer when the filtering mask assembly is worn.

4. The filtering mask assembly of claim 3, wherein the bridging section resiliently folds when pressed against the face of the wearer such that the brim flattens against the face.

5. The filtering mask assembly of claim 3, wherein the face seal is made of a soft resilient material.

6. The filtering mask assembly of claim 3, wherein the face seal is made of any one of a thermoplastic elastomer or an elastomer.

7. The filtering mask assembly of claim 1, wherein the housing comprises at least one battery for powering the fan.

8. The filtering mask assembly of claim 7, wherein the housing comprises at least one chamber, the at least one chamber being adapted to releasably hold the at least one battery.

9. The filtering mask assembly of claim 7, wherein the at least one battery comprises at least one rechargeable battery.

10. The filtering mask assembly of claim 1, wherein the fan further comprises a fan rotor.

11. The mask assembly of claim 10, wherein the fan rotor is adapted to generate a pressure increase of between 5 to 18 mm water gauge with flow rates between 0.25 to 1.5 liters per second.

12. The filtering mask assembly of claim 10, wherein the fan further comprises at least one protection mesh adapted to be placed either in front of either or both of the inlet or the outlet.

13. The filtering mask assembly of claim 10, wherein the fan is a mixed-flow fan.

14. The filtering mask assembly of claim 1, wherein the outlet valve is a one-way valve.

15. The filtering mask assembly of claim 1, wherein the outlet valve comprises a valve body including an aperture in the housing and at least one prong protruding outwardly from the valve body for releasably securing the outlet valve to the housing.

16. The filtering mask assembly of claim 1, wherein the filter comprises at least one of filter layers comprising activated carbon.

17. The filtering mask assembly of claim 1, wherein the assembly is a modular filtering mask assembly whereby the housing, the filter, the fan and the outlet valve are clipped together to form the filtering mask assembly.

18. A method of assembling the filtering mask assembly of claim 1, the method comprising:

(a) providing the housing;

(b) inserting into the housing the fan, the outlet valve and at least one battery for powering the fan;

(c) providing the filter; and (d) releasably clipping the housing and the filter together.

* * * * *